(12) United States Patent
Liet

(10) Patent No.: US 9,682,352 B2
(45) Date of Patent: Jun. 20, 2017

(54) FEED DELIVERY DEVICE

(71) Applicant: Trioliet Holding B.V., Oldenzaal (NL)

(72) Inventor: Cornelis Hendricus Liet, Losser (NL)

(73) Assignee: Trioliet Holding B.V., BE Oldenzaal (NL)

( * ) Notice: Subject to any disclaimer, the term of this patent is extended or adjusted under 35 U.S.C. 154(b) by 0 days.

(21) Appl. No.: 13/943,939

(22) Filed: Jul. 17, 2013

(65) Prior Publication Data

US 2014/0029375 A1    Jan. 30, 2014

(30) Foreign Application Priority Data

Jul. 25, 2012    (DE) .................... 20 2012 007 207 U

(51) Int. Cl.
| | | |
|---|---|---|
| *B01F 13/10* | (2006.01) | |
| *A01K 5/02* | (2006.01) | |
| *A01K 5/00* | (2006.01) | |
| *B01F 13/00* | (2006.01) | |

(52) U.S. Cl.
CPC ............ *B01F 13/1005* (2013.01); *A01K 5/00* (2013.01); *A01K 5/001* (2013.01); *A01K 5/02* (2013.01); *A01K 5/0266* (2013.01); *B01F 13/0037* (2013.01)

(58) Field of Classification Search
CPC .................................................. B01F 13/1005
USPC ............................ 366/134, 181.1, 181.3, 603
See application file for complete search history.

(56) References Cited

U.S. PATENT DOCUMENTS

| | | | | |
|---|---|---|---|---|
| 3,270,896 | A | * | 9/1966 | Sackett, Sr. ......... B01F 13/1005 192/107 M |
| 4,712,919 | A | * | 12/1987 | Bouldin .................... B01F 5/26 366/133 |
| 4,850,304 | A | * | 7/1989 | Nicholson ............... B01F 5/241 118/310 |
| 6,186,654 | B1 | * | 2/2001 | Gunteret, Jr. ........... B01F 5/265 366/18 |
| 6,293,689 | B1 | * | 9/2001 | Guntert, Jr. ........... B28C 9/0418 366/2 |
| 6,505,786 | B2 | * | 1/2003 | Van Der Plas ........ 241/101.763 |
| 6,527,428 | B2 | * | 3/2003 | Guntert, Jr. ........... B28C 9/0418 366/2 |
| 6,658,996 | B2 | * | 12/2003 | Eom .............................. 99/510 |
| 2008/0310247 | A1 | * | 12/2008 | Basaraba ............ B01F 13/1005 366/8 |

FOREIGN PATENT DOCUMENTS

EP    1 021 949 B1    7/2004

OTHER PUBLICATIONS

Search Report which issued on Mar. 12, 2014 in corresponding German Patent Application No. 102013208987.2, with English translation of relevant portions thereof.

* cited by examiner

*Primary Examiner* — Abbas Rashid
(74) *Attorney, Agent, or Firm* — Fish & Richardson P.C.

(57) ABSTRACT

The invention relates to a feed delivery device with at least two feed containers and a device for delivering, mixing and distributing feed. The mixing device and the distributing device are formed separately from each other and are movable relative to each other for assuming a transfer position in a transfer station, where the mixing device has a movement.

9 Claims, 12 Drawing Sheets

DETAIL "C"

DETAIL "D"

FEED DELIVERY DEVICE

BACKGROUND OF THE INVENTION

The invention relates to a feed delivery device having at least two feed containers and a device for dispensing, mixing and distributing the feed.

Feed delivery devices, with which feed can be dispensed from storage containers, mixed in the desired manner and presented to the animals to be fed in a dosed manner, are well known in prior art. A feed delivery device is known, for example, in which a plurality of storage containers is allocated to a mixer which is via conveyor and incline conveyors belts fed feed from each storage container in a predetermined amount. The mixer mixes the animal feeds and dispenses them onto a conveyor device which then introduces the mixed feed into a distributor wagon, where the distributor wagon then moves along the stable lane and presents a predetermined amount of feed to the animals.

A feed delivery device is further known in which a robot drives along the storage containers and itself controls its own filling action with different amounts of various feeds. The robot drives along the stable lane and thereby also acts both as a mixer and as a distributor wagon.

However, both are relatively rigid and not very expandable. Space problems will arise in particular for very large companies that need to supply many thousands of cattle. The large amounts of feed necessary there, for example, 220 to 250 tons per day for supplying 5,000 cows, can no longer be stored in the vicinity of the stable. With feed containers partially or completely stored off-site, however, the known solutions with the distributor wagons being directly filled by the feed containers or by a stationary mixer are no longer practical, if, e.g., the transport distances are too great and the necessary infrastructure is too complicated. The energy costs (fuel consumption) are also too high, if one uses robots and/or mixers to overcome greater distances.

SUMMARY OF THE INVENTION

The object of the invention is a feed delivery device that can be universally adapted in view of the existing location and operating conditions.

The object is satisfied by the present invention described herein

Due to the separation of the mixing device and the distributing device and due to the movable design of the mixing device, so that it can serve as feed collection container, transportation of the feed between the feed container and the distribution station in the stable can be designed flexibly and be closely adapted to the actual needs. The mixing device can act as a buffer, for example, mixing the next feed ration, while the previous one is dispensed. Fewer stationary conveyors are required or such conveyors can even be omitted due to the movability of the mixing device, so that extension of the feed storage is easily possible and at relatively small costs. A particular advantage of the solution according to the invention is that transport of the mixed feed from the feed storage site to the consumption location is designed very flexibly and can cover, for example, also greater distances.

Due to the design according to the invention, there is the option to cover larger distances by using a freely movable vehicle, i.e. a vehicle which, for example, requires none of the provisions that are necessary in prior art to keep the distributor robot on its path.

A roadworthy vehicle such as a truck or a tractor can therefore be used which either fills the distribution containers or drives the distribution containers from the mixing device to the consumption location back and forth or is even itself designed as a distribution container.

A conventional feed mixer is preferably used as the mixing device, for example, a conventional mixer wagon with one or more vertical augers being arranged in the container.

The mixing device is preferably self-propelled and comprises, furthermore preferably, an actual mixing container which is arranged on a ground-based chassis.

The height adjustment necessary for loading the distributing device at a transfer station can be preferably effected by a vertical movement of the mixing device and/or the distributing device.

To bridge height differences, the mixing device is provided with a lifting device. The lifting device can be, for example, a crane or a hoist.

To bridge height differences, a path guided across climbs and descents can be provided in addition or as an alternative to the lifting device for the ground-based movement of the mixing device between the feed containers and the transfer station.

The relatively small distances that must be traveled by the mixing device can be easily accomplished using an electromotive drive which is much more effective than propulsion with a gasoline/diesel engine.

The feed containers are preferably provided with an outlet/discharge aid in such a manner that they can automatically be actuated by the mixing device, so that the mixing device is able to dispense a predetermined amount from a predetermined feed container.

Preferably, the direction of movement of the mixing device in the horizontal direction is predetermined by a lane located below the height level of the unloading aid so that the mixing container of the mixing device can be filled from above.

The transfer station is normally above the height level of the lane, where the distributing device is preferably also adapted for vertical movement, so that the entire vertical movement necessary for transferring the mixed feed does not need to be effected only by the mixing device.

Preferably, the transfer station is provided with a lane being disposed lower for the distributing device.

BRIEF DESCRIPTION OF THE DRAWINGS

The invention is below explained using embodiments.

DETAILED DESCRIPTION OF THE INVENTION

Figure 1:
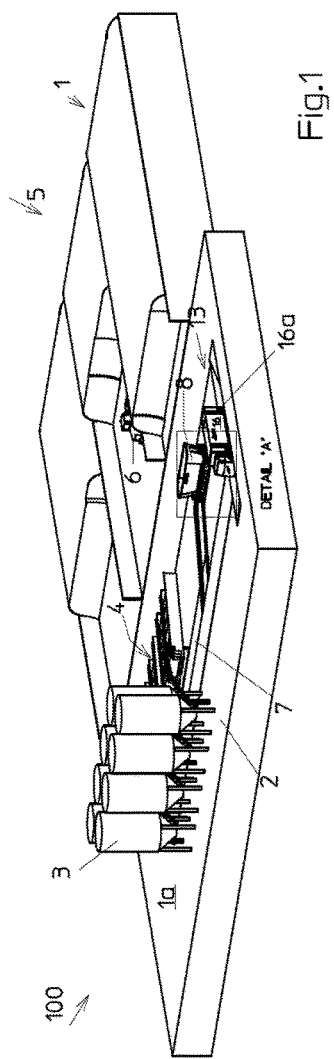
FIG. 1 shows an embodiment of a feed delivery device according to the invention in a schematic representation.
Figure 2:
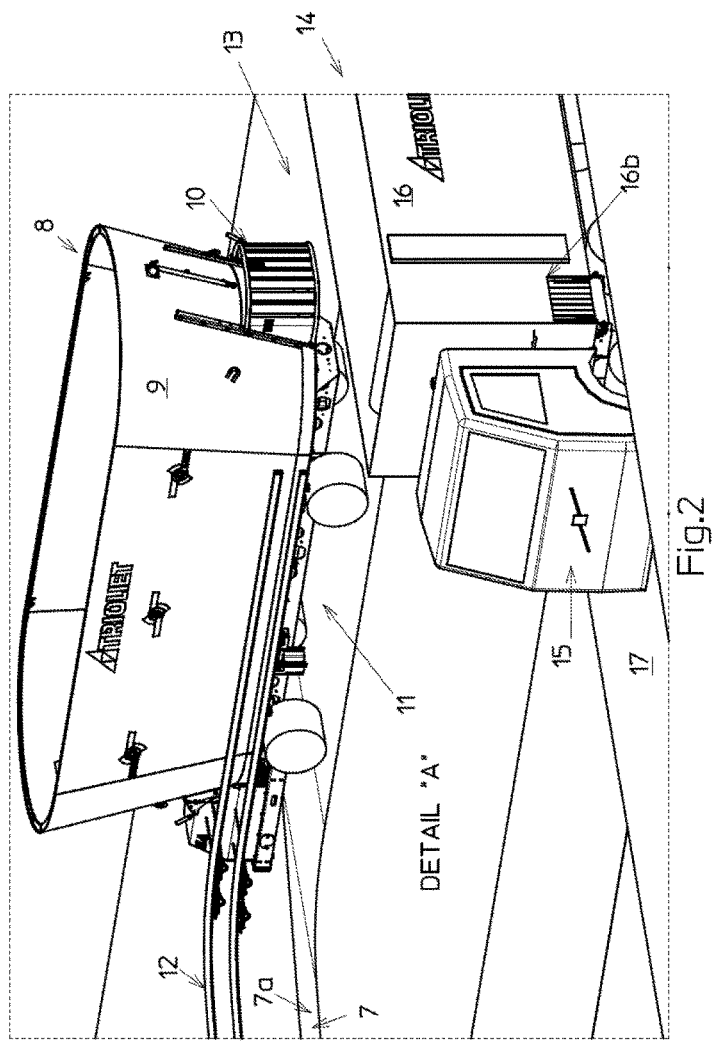
FIG. 2 shows the enlarged detail "A" from FIG. 1.

A first embodiment of a feed delivery device 100 according to the invention is shown in FIGS. 1 to 4 which includes a feed storage site 1 and a device 2 for intermediate storage, dispensing, mixing and distributing of the feeds.

The feed storage site is composed of a plurality of feed containers, where the term "container" is to comprise not only the bulk silos 3 illustrated, but also storage areas 4 (or bunkers) which are preferably roofed and are filled e.g. by trucks from mobile silos 5 that can optionally also be located further remotely. The term "container" also comprises other types of storage facilities not shown for feeds and feed additives.

Each of the containers 3, 4 of the storage site 1 communicates with a dispensing device 3a or 4a, respectively, where the dispensing device 3a of the silo containers 3 can, for example, be shutes or discharge pipes or the like, whereas the discharge device, 4a of the storage areas 4 can be cross conveyor belts or push floors, walking floors, floor conveyors or the like, onto which the feed from the individual mobile silo 5 is applied by appropriate devices, such as a tractor fitted with a loading device 6 for compartments accessible by vehicles.

The discharge devices 3a, 4a are designed for dosing, where a predetermined amount of feed is dispensed in a dosed manner, in particular, by opening and closing shut-off devices or by switching conveyor movements on and off. The dispensing devices 3a, 4a terminate above a path 7 on which the mixing device 8 moves. The path 7 is designed as a lane that lies preferably below the surface level 1a of the storage site 1 in the region of the feed containers 3, 4.

The mixing device 8 is provided with an actuating device—not shown—which in a controlled manner when passing through the discharge device 3a, 4a actuates predetermined discharge devices from the plurality of containers 3, 4 for conveying feed, so that predetermined amounts of the feed contained therein enter the mixing device 8. The term "mixing device" can comprise conventional single- or multiple-element devices suitable for mixing feeds.

The mixing device 8 in the illustrated embodiment comprises a self-propelled vehicle of the kind of conventional mixing wagons, and comprises a container 9 having a filling opening facing upwardly in the interior of which mixing devices—not shown—such as one or more vertical mixing augers or the like are arranged. Furthermore, the mixing device 8 comprises an outlet 10 through which the mixed material can be dispensed from the container 9. The outlet 10 is preferably located on a narrow side of the long-oval-shaped container 9, but can also be provided on one or both long sides, depending on which side the dispensing is to occur.

The mixing device 8 further comprises a ground-based chassis 11 on which the container 9 is mounted. The chassis and the mixing device are preferably driven by an electric motor and are forced by guiding devices 12, such as guide rails and/or sliding contacts, to move back and forth along the path 7 and supplied with power.

The path 7 extends from the feed containers 3, 4 to a transfer station 13 at which the mixed feed is passed from the container 9 through the outlet 10 to a distributing device 14. The term "distributing device" can comprise single- or multiple-element devices that are suitable for transport over long distances and for dosed distribution of feed.

The distributing device 14 in the embodiment shown comprises a freely movable, in particular roadworthy, vehicle in the form of a truck 15, on the bed of which a container 16 is mounted, which is either detachable and in the stable serves as a distribution container, or which is formed to transfer mixed feed to the actual distribution container of conventional design, or even comprises one of the conventional dispensing and dosing devices 16a or 16b, so that the truck 15 can drive into the stable lane and there handle distribution and dosing out of the feed.

The container 16 on the truck 15 is loaded from above through an upwardly facing opening. For bridging difference in height between the bottom side of the dispensing device 10 and the top side of the container 16, a vertical movement of the mixing device 8 or at least of the container 9 with the dispensing device 10 relative to the distributing device 14 is necessary.

In the embodiment illustrated, this is preferably achieved by a movement of the mixing device 8 upwardly through a ramp 7a of the path 7 and, in order to let the difference in height to be managed through the ramp not become too great, additionally by a vertical movement of the distributing device 14, in particular, of the container 16. For this purpose, the container 16 is moved to a travel lane 17 deepened at the transfer station 13, until the filling opening of the container 16 is located below the dispensing device 10 of the mixing device 8. However, the vertical movement can also be performed only by the mixing device 8 or only by the distributing device 14.

The travel lane 17 is preferably designed as a "one-way street" with entry and exit ramps and is so narrow that correct positioning of the container 16 below the dispensing device 10 is simultaneously facilitated.

Figure 3:
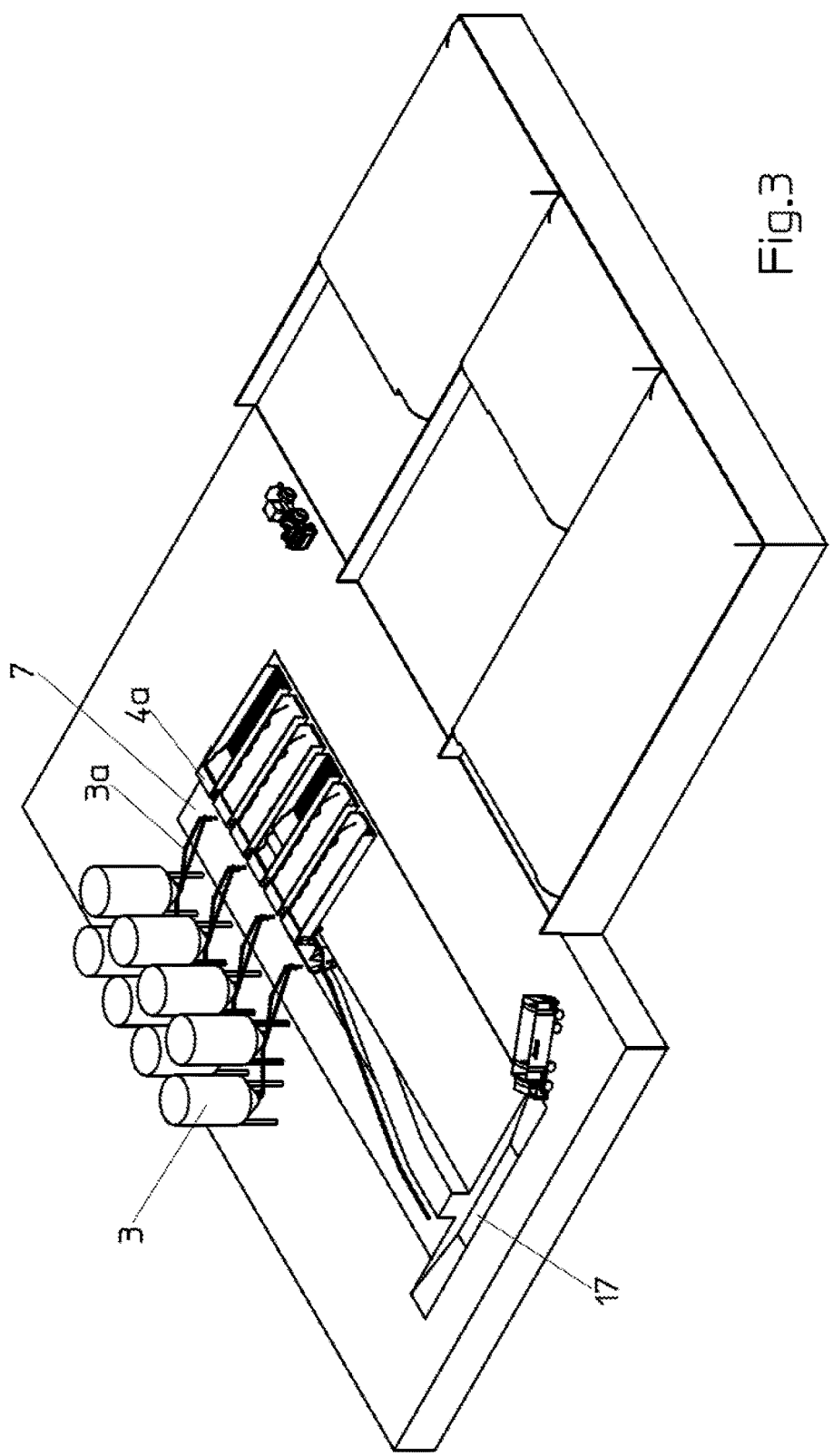
FIG. 3 shows the delivery device of FIG. 1 while the mixing device is being filled.

During operation as shown in FIG. 3, the mixing device 8 is moved below the discharge devices 3a, 4a, where it is opened either by a central control unit also controlling the mixing device 8, or by the mixing device 8 itself, so that predetermined amounts of feeds enter from the individual containers 3, 4 from above into the container 9 of the mixing device 8.

Figure 4:
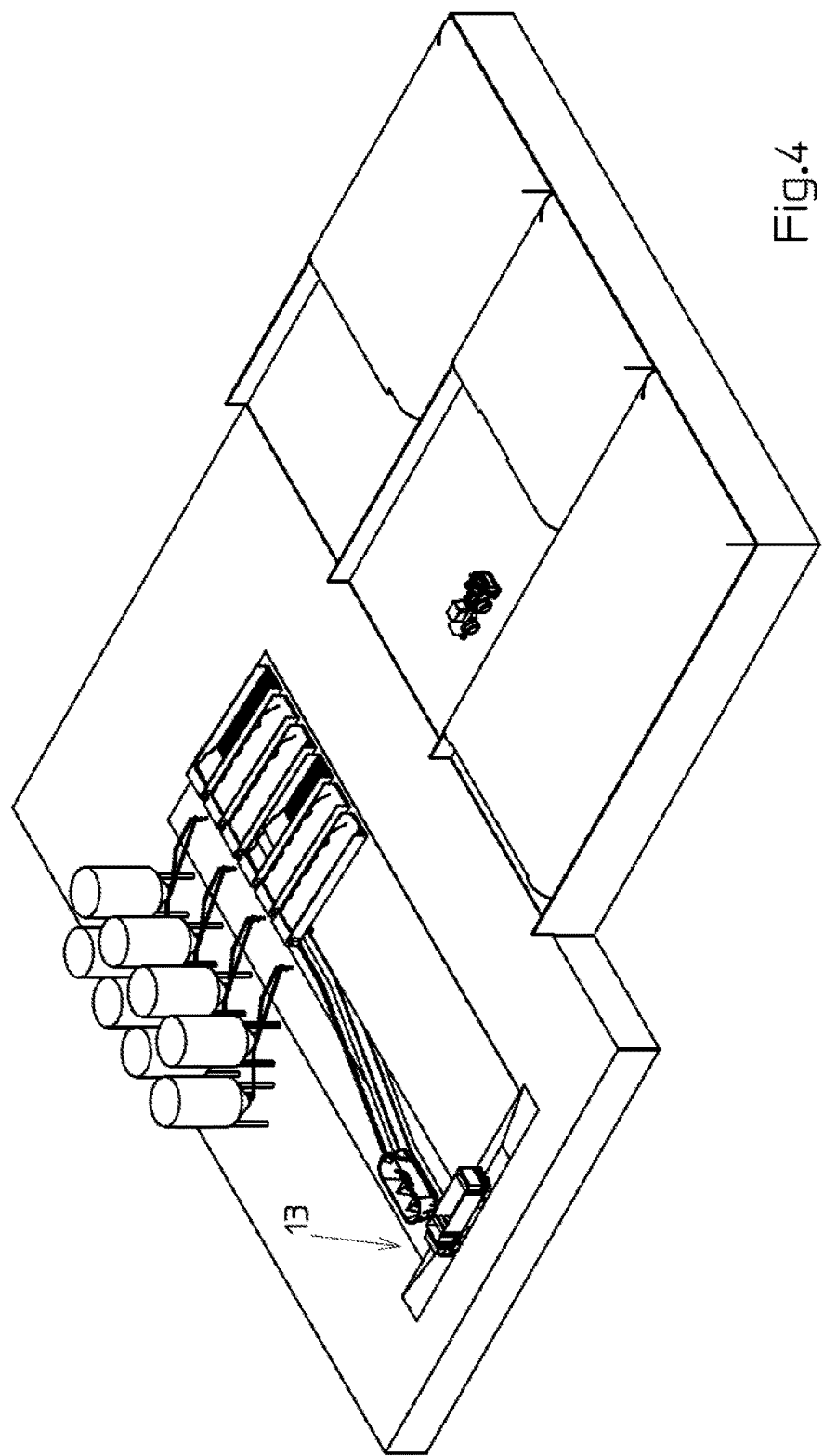
FIG. 4 shows the delivery device of FIG. 1 during the transfer.
Figure 5:
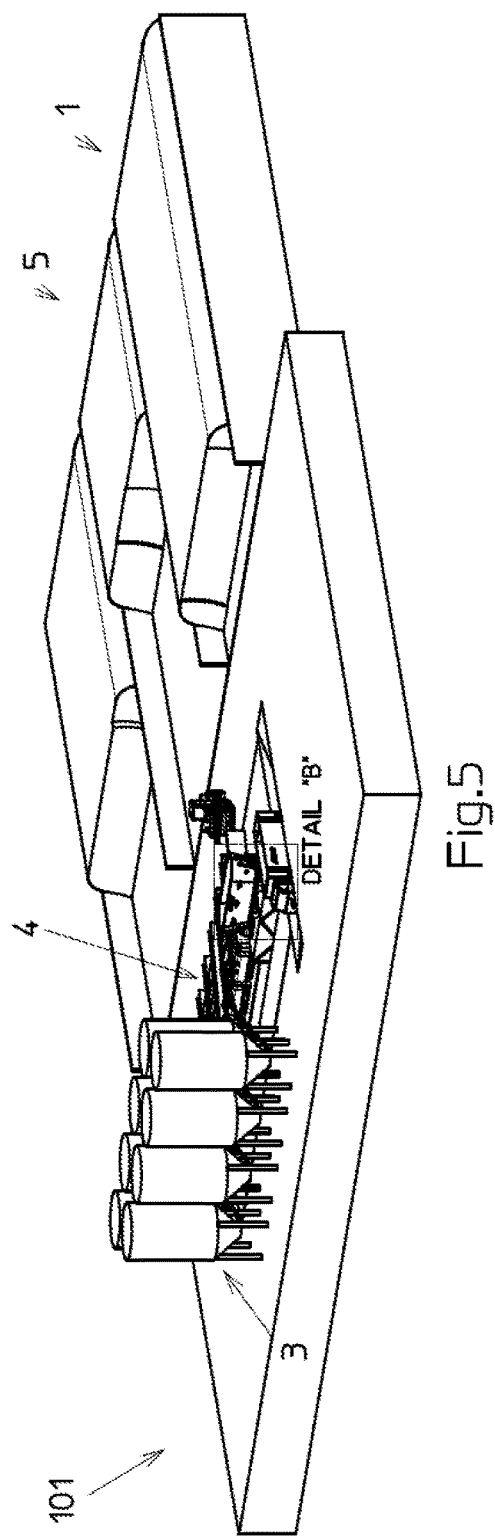
FIG. 5 shows another embodiment of a feed delivery device in a highly schematic representation.
Figure 6:
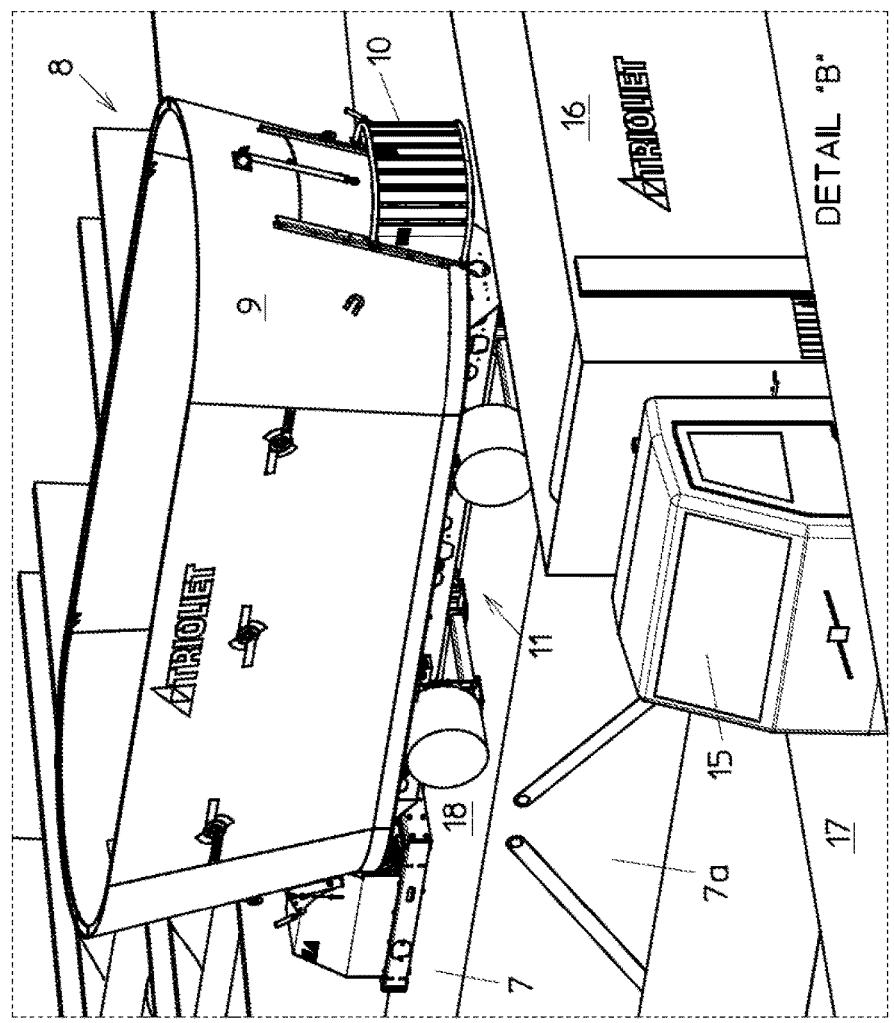
FIG. 6 shows the enlarged detail "B" from FIG. 5.
Figure 7:
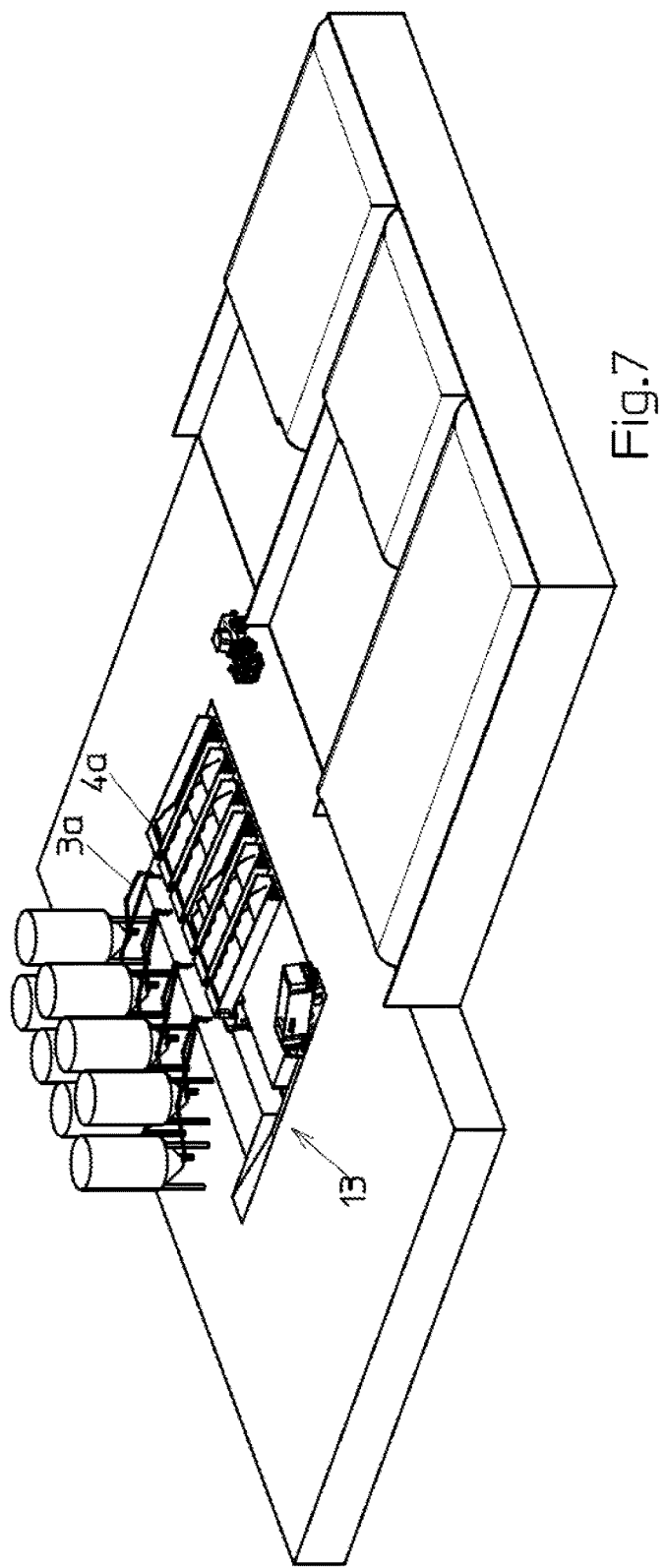
FIG. 7 shows the delivery device of FIG. 5 while the mixing device is being filled.
Figure 8:
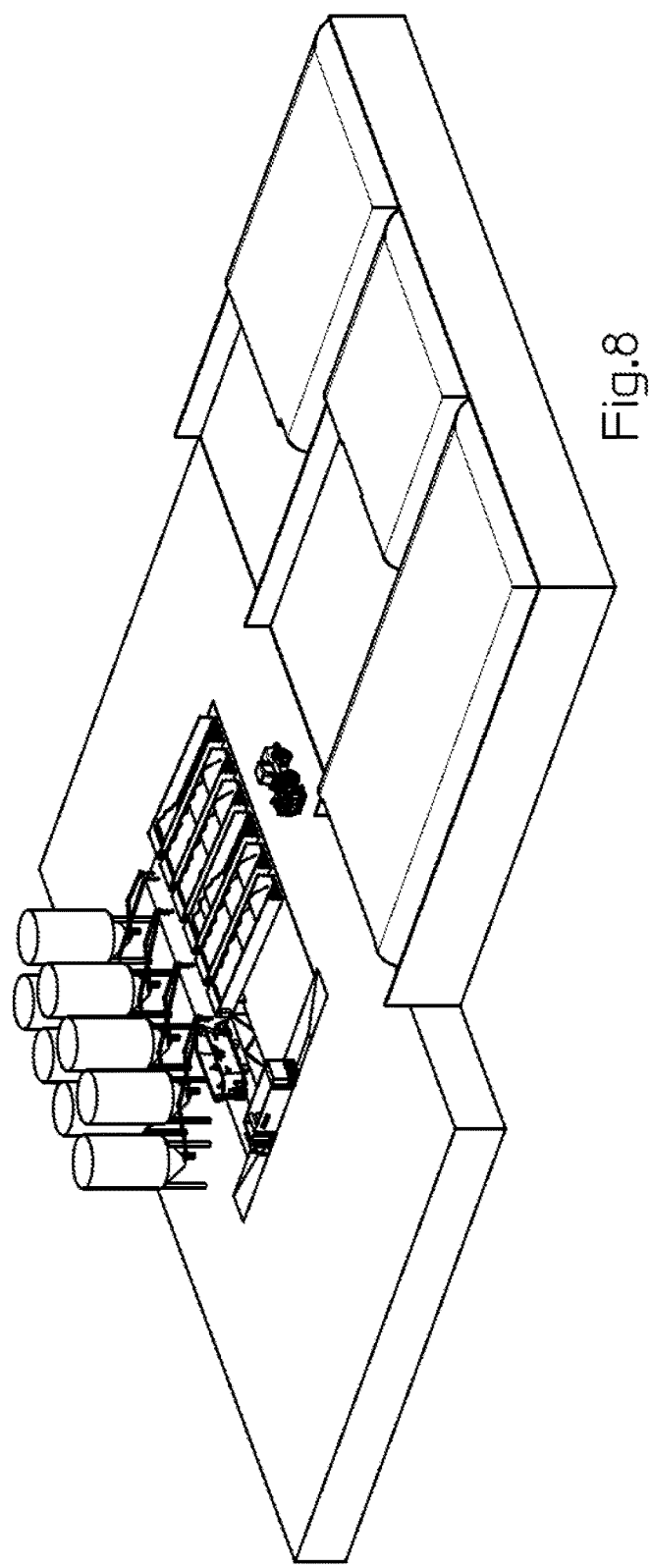
FIG. 8 shows the delivery device of FIG. 5 during the transfer.
Figure 9:
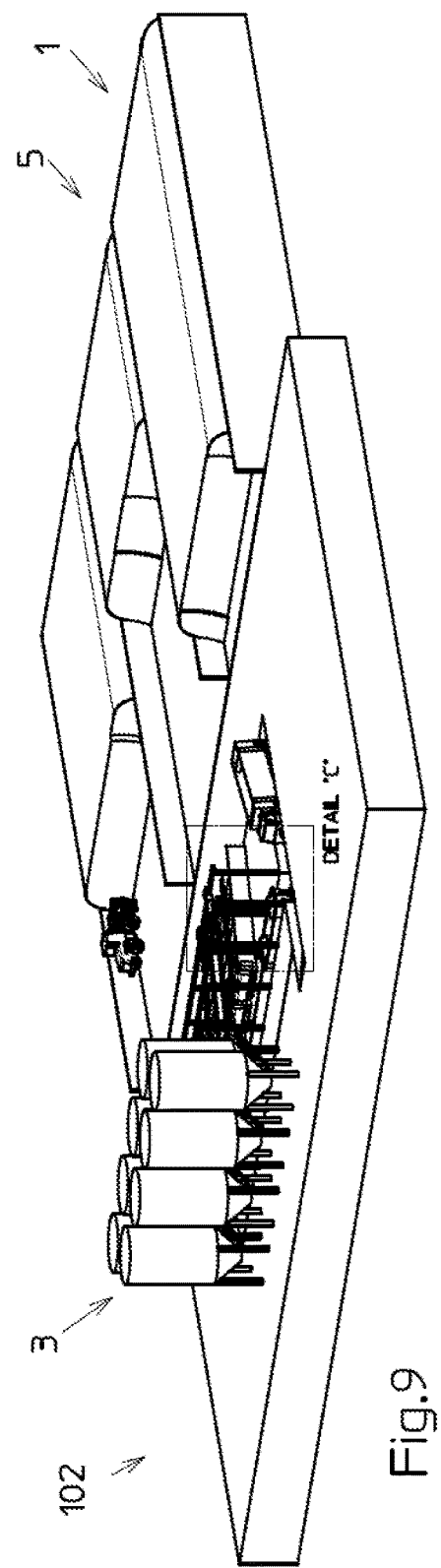
FIG. 9 shows another embodiment of a delivery device according to the invention in a highly schematic representation.
Figure 10:
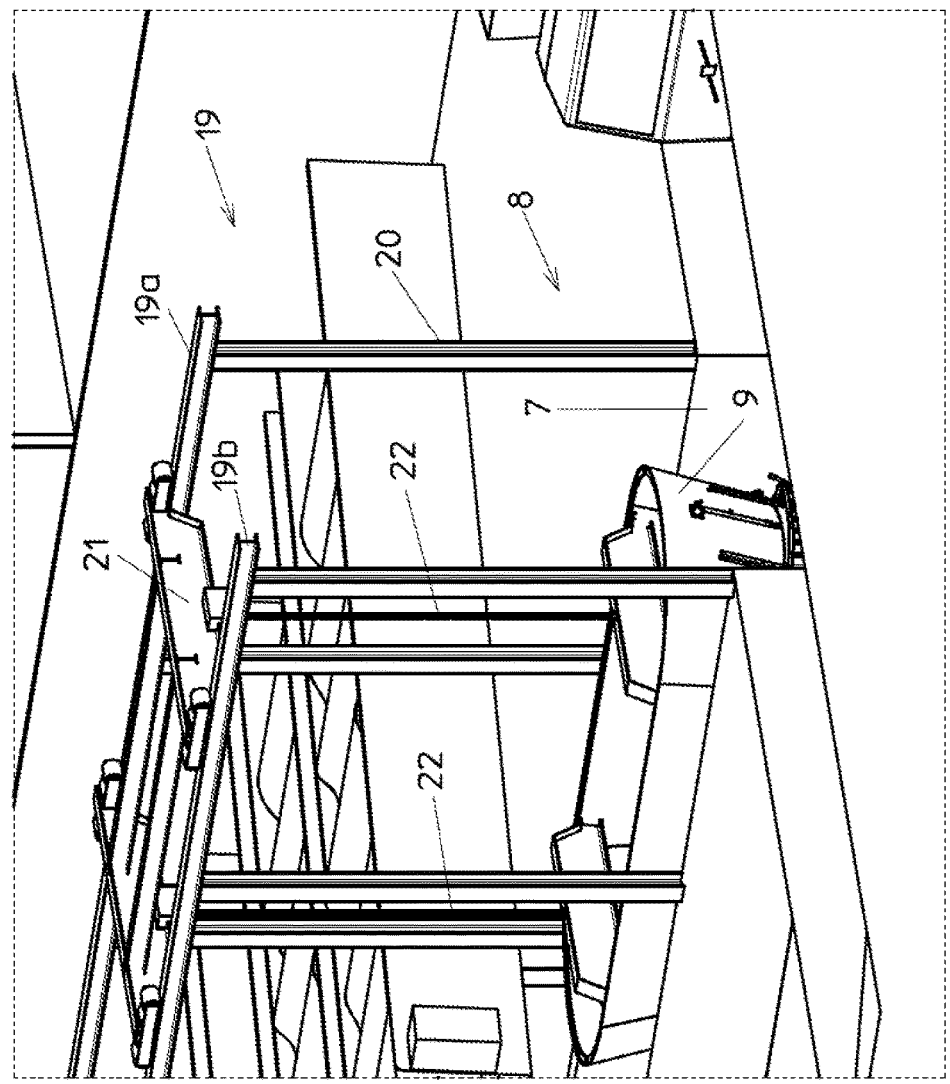
FIG. 10 shows the enlarged detail "C" from FIG. 9.
Figure 11:
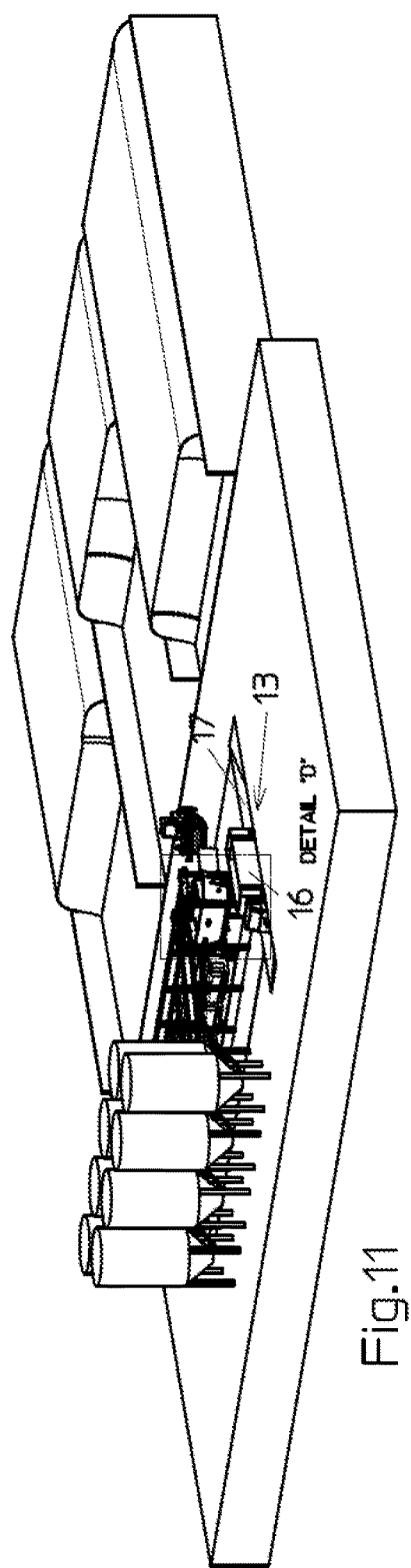
FIG. 11 shows the delivery device of FIG. 9 during the transfer.
Figure 12:
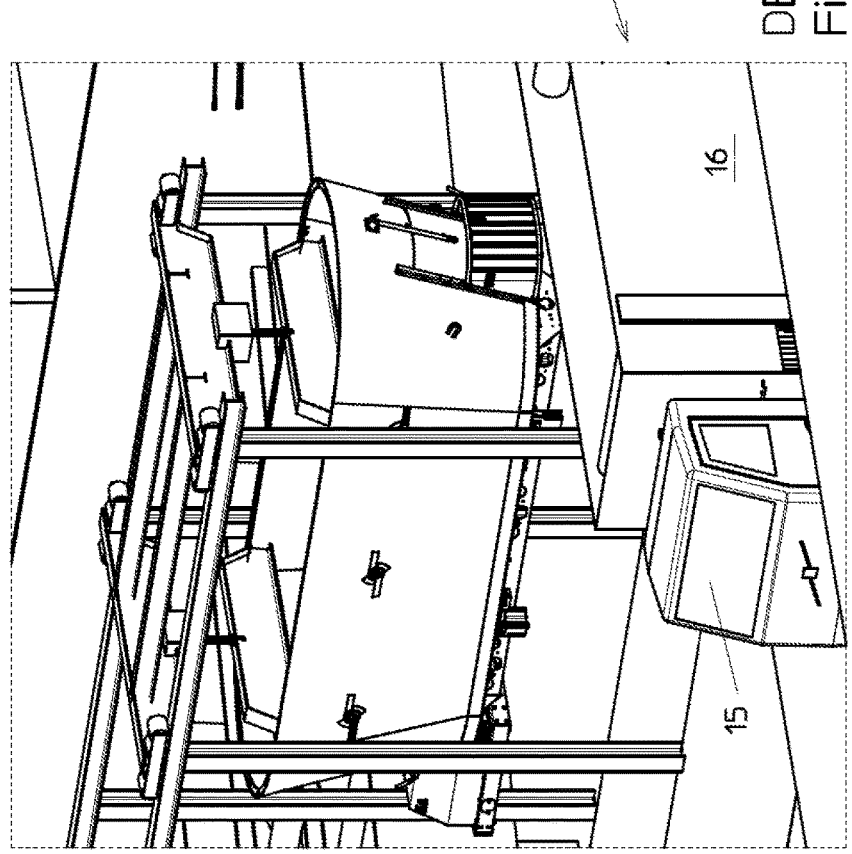
FIG. 12 shows the enlarged detail "D" from FIG. 11.

The mixing device 8 then moves to the transfer station 13, as FIG. 4 shows, and the container 16 of the distributing device 14 is also moved to the transfer station 13. When the dispensing device 10 is above the filling opening of the container 16, then the content of the container 9 is passed to the container 16. The vehicle 15 leaves the transfer station 13 and the mixing device 8 returns to the feed containers 3, 4 for a new mixing process.

A further embodiment 101 of a feed delivery device is evident from FIGS. 5 to 8, which differs from the embodiment 100 only in the manner in which the vertical movement of the mixing device 8 is effected. According thereto, the same or similar components are depicted with the same reference numerals and are not explained again.

In the embodiment shown in FIGS. 5 to 8, the ramp 7a of the delivery device 100 is replaced or supplemented, respectively, by a lifting platform 7a which is incorporated into the path 7. The lifting platform 7 is of a conventional type and is presently, for example, comprised of an extendible platform 18 onto which the chassis 11 of the mixing device 8 with the container 9 can drive up. Provisions are made (brake, fixation or the like) to keep the mixing device 8 at a predetermined location on the lifting platform.

A further embodiment 102 of a feed delivery device according to the invention is shown in FIGS. 9 to 12 which is designed like the embodiment 100 except for the manner in which the vertical and horizontal movement of the mixing device 8 is effected. The delivery device 102 uses a mixing device 8 without its own chassis, where the container 9 is vertically movably suspended on a crane or traveler crane frame 19 and is movable horizontally therein. The construction of the frame 19 is of a conventional type and comprises, for example, two support rails 19a, 19b which are kept at a distance from the ground by supports 20 and extend along the path 7. The container 9 is suspended with chains 22 from a span 21. The span 21 moves along the support rails 19a, 19b and the cables 22 can be shortened or lengthened for a vertical movement of the container 9. Cables or similar standard drives can be used instead of chains.

In a modification of the described and illustrated embodiments, the feed delivery device according to the invention can be designed also for other types of containers. If the storage site, for example, does no need to contain storage compartments with vehicle access, then the path of the mixing device or distributing device does not necessarily need to be disposed in a lowered lane. The vertical movement can also be performed solely by the mixing device or the distributing device. Natural terrain differences can also be used for ramps or lowered travel lanes at the loading and/or transfer station.

The invention claimed is:

1. Feed delivery device comprising at least two feed containers and a device for dispensing, a device for mixing and a device for distributing feed, said mixing device and said distributing device are formed separately from each other and are movable relative to each other to a transfer position in a transfer station for passing mixed feed from the mixing device to the distributing device where said mixing device is provided with an actuating device which is adapted to actuate predetermined dispensing devices of the at least two feed containers for conveying feed in a controlled manner, so that predetermined amounts of feed contained in the at least two feed containers enter the mixing device and where said mixing device is self-propelled and comprises a movement device, which is designed to move said mixing device along said feed containers for entering feed from the feed containers to the mixing device and to move said mixing device to the transfer station at said distributing device, and wherein said mixing device and said distributing device are movable relative to each other in the vertical direction for assuming said transfer position at said transfer station, and said mixing device further comprises a ground-based chassis on which a container is mounted, and wherein the feed delivery device further comprises guiding devices which force said mixing device to move along a predetermined path, said predetermined dispensing devices terminating above the path.

2. The delivery device according to claim 1, wherein said distributing device comprises a freely movable vehicle.

3. The delivery device according to claim 1, wherein said distributing device comprises a road-worthy vehicle, such as a truck or a tractor.

4. The delivery device according to claim 1, wherein the container of said mixing device comprises an integrated mixer.

5. The delivery device according to claim 1, wherein said predetermined path has an inclination and/or a descent between said feed containers and said transfer station.

6. The delivery device according to claim 1, wherein said mixing device is provided with a lifting device.

7. The delivery device according to claim 1, wherein a direction of movement of said mixing device in a horizontal direction is pre-determined by a lane disposed below a height level of said feed containers.

8. The delivery device according to claim 7, wherein said transfer station is disposed above a height level of said lane.

9. The delivery device according to claim 1, wherein a lane being disposed in a lowered location is provided at said transfer station for said distributing device.

* * * * *